Otto Meixner
INVENTOR

Karl F. Ross
Attorney

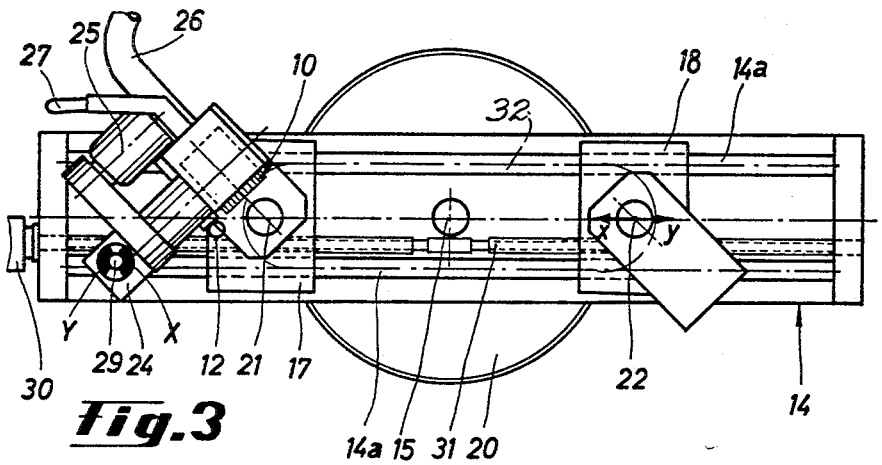
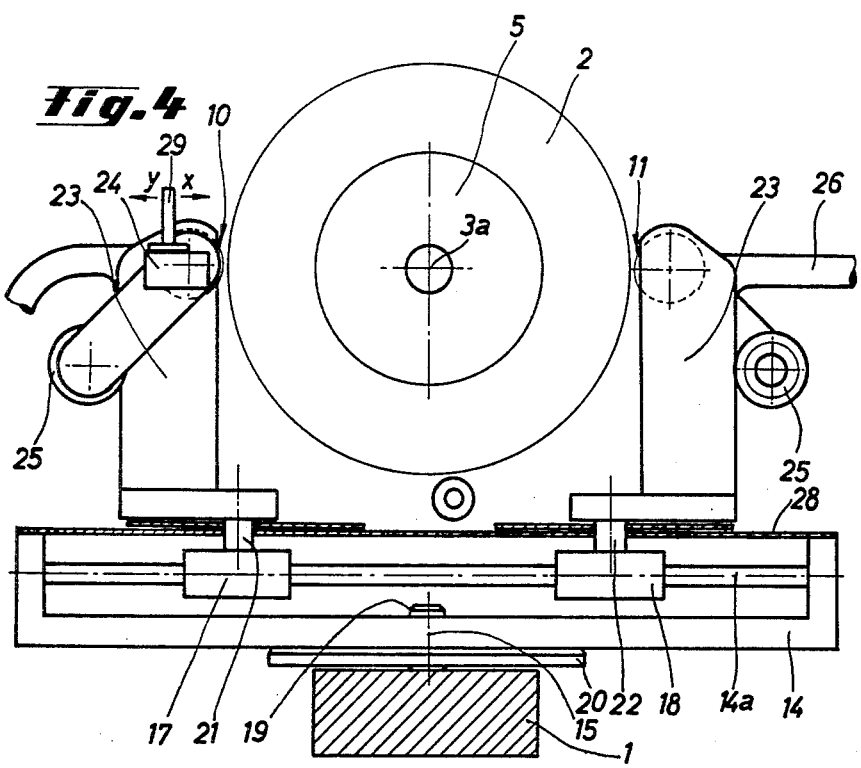

United States Patent Office 3,473,596
Patented Oct. 21, 1969

3,473,596
MACHINE FOR PREPARING WORN PNEUMATIC TIRES TO BE CIRCUMFERENTIALLY RENEWED
Otto Meixner, Lubeck, Westpreussenring 108a, Germany
Filed Sept. 23, 1966, Ser. No. 581,504
Claims priority, application Germany, Sept. 25, 1965, C 36,974
Int. Cl. B29h 21/08
U.S. Cl. 157—13                                 5 Claims

ABSTRACT OF THE DISCLOSURE

A worn tire to be circumferentially renewed or retreads is rotated about an axis transverse to the median axis of the tire while two processing tools are brought into engagement with its shoulder and tread portions. The two tools are engageable with diametrically opposed sides of the tire and are rotatable about axes lying in a common plane which is rotatable in turn about a central axis transverse to and intersecting the tire-rotation axis. Means are provided coupling the two tools together to move them together homologously about their respective rotation axes and toward and away from the central axis.

---

Figure 1:
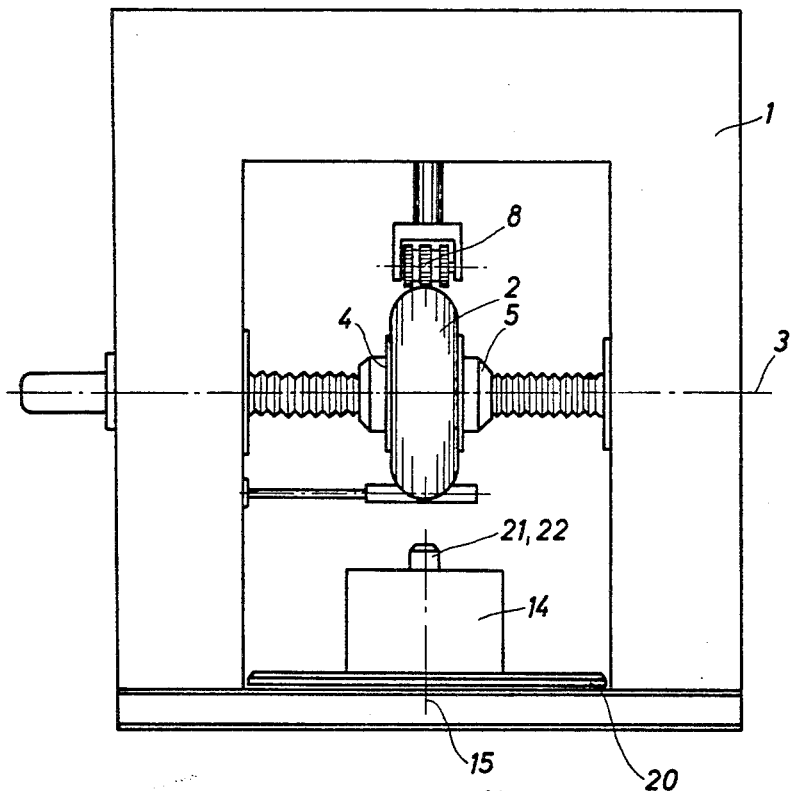

This invention relates to a machine for preparing worn pneumatic tires to be circumferentially renewed, particularly for peeling and roughening the tire with at least one rotatably driven processing tool, in which the tire to be processed is supported in a machine frame between a pair of relatively axially movable rim plates rotatably driven about a horizontal axis.

For peeling tires which are to be circumferentially renewed machines of various construction are known. The manufacturers of such machines endeavor to construct the machine in such a manner that the processing comes as close as possible to the tire canvas or card without damaging the same.

This latter operation must be carried through with great exactness and is generally accomplished with rotating processing tools, so-called rougheners. Principally two different methods and machine types are used, namely the pattern roughening and the visual roughening which is carried through by the operator and depends solely on his skill.

Both mentioned methods are afflicted with drawbacks. In pattern roughening, for example, it is disadvantageous that differences in the size of one and the same type of tires caused by stretching during driving as well as cross-sectional differences of tires of one and the same type cannot be taken care of. Also disadvantageous is the frequent change of the patterns, or the readjustment of them respectively according to the tire size, when tires of different manufactures are to be processed. These factors are taken care of when using the visual method, but there is the danger that the tire is roughened unsymmetrically relative to its cross section since the operator has no control over this. Besides this, the visual control of the tire and the comparison of the sides are extremely time consuming.

It is the object of the invention to provide an improved machine of the initially mentioned machine type for processing tires to be circumferentially renewed which, without using patterns' etc., allows an unobjectionable processing of the tires. At the same time the machine shall be of simple construction and allow rapid working.

According to my invention two processing tools are disposed diametrically with respect to the tire to be processed and are journalled on a support pivotal about an axis intersecting the tire center and disposed normally to the tire axis, said processing tools being radially adjustable towards the center of the tire and being pivotal about the axes of the support extending in parallel relation to the axis intersecting the center of the tire, and that the processing tools are coupled in such a manner that their radial and their pivotal movements are homologus. Thereby it is achieved that the tire is processed simultaneously and fully evenly on both sides of its median plane, since the movements of the two processing tools are inversely equal. In this the procedure is such that the operator merely controls one of the tools or roughening units while the second tool automatically follows the movements of the first tool.

Figure 2:
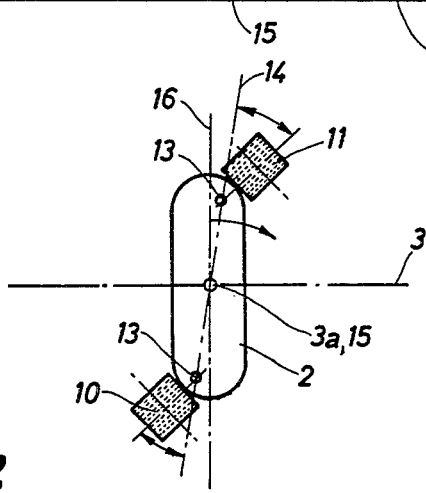

Further details and advantages of the invention are described in the following with reference to the attached drawings in which:

FIG. 1 is a simplified front view of the machine;
FIG. 2 is a diagrammatic top view of the processing tools acting upon the tire;
FIG. 3 is a diagrammatic top view of the processing tools and the support; and
FIG. 4 is a sectional lateral view of the clamped tire and the processing tools.

The machine consists substantially of a rectangular frame 1 of any suitable construction. Within this frame 1 the tire 2 is journalled and rotatably driven about a horizontal axis 3. The tire is clamped between two rim plates 4 and 5.

The drive of the tire (means for rotating the tire) is achieved by a serrated drive roller 8 driven by a not illustrated electric motor. This drive roller 8 is mounted in the machine frame 1 in such a manner that it may be lifted or lowered and is urged by spring pressure or compressed air against the upper edge of the clamped tire.

In the lower part of the machine frame 1 the processing tools 10 and 11 are arranged. In the illustrated example of one embodiment these tools are two roughening units as shown in U.S. Patent No. 3,080,899. However, peeling knives or the like as shown in U.S. Patent No. 2,751,979 may also be provided, such as an annular knife 12 (FIG. 3).

According to the invention the two processing tools are diametrically disposed on opposite sides of the tire 2. They are radially adjustable towards the center 3a of the tire, and are each pivotal about an axis 13, as shown in FIG. 2. The processing tools are arranged on a support 14 pivotal about an axis 15 intersecting the center 3a of the tire. In the illustrated embodiment this axis is disposed vertically and normally to the axes 3 of the tire. The axis 13 extend in parallel relation to this pivot axis 15. The two processing tools 10 and 11 are coupled in such a manner that their radial and pivotal movements are inversely equal so that upon pivoting or guiding of the processing tool 10 the other tool 11 will automatically follow its movement.

The support 14 is pivotally displaceable from an initial position normal relative to the tire axis 3 in one direction only. By such pivoting movement the pivot axes 13 are moved out of the median plane 16 of the tire 2 as shown in FIG. 2. The working surfaces of the tools 10 and 11 are spaced fixed distances from the axes 13. This spacing is selected so that it corresponds substantially to the radius of the tire balloon expanded to the working mouth width, i.e. the width between the beads. For changing the radial distance of the processing tools the axes 13 are evenly adjustable relative to the pivot axis 15 as will be described below.

The processing tools 10, 11 are effective on opposite sides of the median plane 16 of the tire shifted to each other about 180°. Since their movements starting from the median plane of the tire are exactly equal the tire is processed symmetrically.

In detail the machine is constructed as follows:

The support 14 is formed as a guide with guide rods 14a for two slides 17 and 18. It is pivotal about a pin 19 of the machine frame 1 and is carried by a disc 20 adapted to be arrested at its edge. By suitable arresting means (not shown) the support 14 is also prevented from swinging through the median plane of the tire.

The slides 17 and 18 carry pins 21 and 22 on which the housings of the processing tools 10 and 11 are supported. The housing 23 disposed on the control side of the machine is provided with a control housing 24 which carries switches, operating buttons etc. A handle 27 is also rigidly connected to the housing serving to mechanically guide the processing tools, particularly for pivoting about the axis 13. This pivoting movement is transferred by suitable mechanical, hydraulic, or electric means from the one housing 23 to the other one. The pins 21 and 22 may, as illustrated, be rigidly connected to the housings 23 and extend through the slides 17 and 18. Below the slides they may carry sprocket wheels over which a chain system shown schematically by a dot-dash line 32 is guided which transmits the rotating movement of the pins 21 and 22, and is adapted and equipped with a chain adjuster well known per se to allow a change in spacing between the pins 21 and 22. The support 14 is provided with a suitable enclosure 28. A button, or hand lever (not shown) for arresting the support 14 is arranged on the handle 27. The control housing 24 also carries a handle 29 serving to adjust the radial distance of the processing tools from the center of the tire. This adjustment is advantageously accomplished by a motor drive 30 via a threaded spindle 31 with right and left hand thread as shown on page 26–6 of Rothbart's Mechanical Designs and Systems Handbook, McGraw-Hill, N.Y. (1964). The handle 29 is movable for this purpose and provided with contacts for switching on the adjustment motor 30. The contacts on the handle 29 are arranged in such a fashion that only a movement directed toward or away from the center 3a of the tire will cause the adjustment drive 30 to become effective. This is advantageous because the operator will always have to move the handle 29 in the accustomed direction regardless of differing pivotal positions of the roughening units for adjusting the radial distance of the processing tools. For example, the handle may actuate a rubber-metal switch having two positions X and Y for actuating the drive 30 to move the tools 10 and 11 in directions which are diagrammatically illustrated and denominated with $x$ and $y$, in which the position X formed by contacts or a contact bank serves to move the processing tools towards each other in the direction $x$ while the other opposite position Y serves to move the tools away from each other in the direction $y$.

The infinitely adjustable pivotal movement of the support 14 is readable on a suitable scale and is related to the clamped balloon size, or the operating mouth width of the tire. In belted tires and for shoeing certain tires the roughening is accomplished in such a manner that the support 14 only is pivoted about the axis 15. Thereby the correct roughened surface extending in parallel relation to the running surface is automatically formed.

What is claimed is:

1. A machine for preparing worn pneumatic tires to be circumferentially renewed, said machine comprising:
   means for rotating said tire about a tire axis;
   a pair of processing tools engageable with diametrically opposed sides of the rotating tire;
   first means for rotating said tools through equal angular distances in opposite senses about mutually parallel respective tool axes;
   second means for rotating said tool axes through equal distances in the same sense of rotation about a central axis intersecting said tire axis, said tool axes and said central axis lying in a common plane transverse to said tire axis; and
   third means for displacing said tool axes through equal distances toward and away from each other.

2. The machine defined in claim 1, further comprising control means for said first, second, and third means mounted adjacent one of said tools.

3. The machine defined in claim 1, further comprising tool-supporting slides, said first means comprising pins pivotally carried by said slides.

4. The machine defined in claim 3 wherein said second means comprises an elongated support carrying said pins and rotatable about said central axis.

5. The machine defined in claim 4 wherein said third means comprises a compound screw interconnecting said tool axes and rotatable to move the same toward and away from each other.

References Cited

UNITED STATES PATENTS

| 2,751,979 | 6/1956 | Holland | 157—13 |
| 3,080,899 | 3/1963 | Robertson | 157—13 |
| 2,805,699 | 9/1957 | Reading | 157—13 |

FOREIGN PATENTS

| 241,619 | 11/1962 | Australia. |

THERON E. CONDON, Primary Examiner

H. M. CULVER, Assistant Examiner

U.S. Cl. X.R.

51—106; 82—86